(12) United States Patent
Hyun (10) Patent No.: US 9,615,557 B2
(45) Date of Patent: Apr. 11, 2017

(54) FISHING REEL EQUIPPED WITH SNAP LOCK BUTTON FOR SPOOL

(71) Applicant: DOYO ENGINEERING CO., LTD., Bucheon (KR)

(72) Inventor: Kwang Ho Hyun, Bucheon (KR)

(73) Assignee: DOYO ENGINEERING CO., LTD., Bucheon (KR)

( * ) Notice: Subject to any disclaimer, the term of this patent is extended or adjusted under 35 U.S.C. 154(b) by 0 days.

(21) Appl. No.: 14/918,886

(22) Filed: Oct. 21, 2015

(65) Prior Publication Data

US 2016/0113259 A1  Apr. 28, 2016

(30) Foreign Application Priority Data

Oct. 22, 2014  (KR) .................. 10-2014-0143445

(51) Int. Cl.
*A01K 89/01* (2006.01)
*A01K 89/015* (2006.01)
*A01K 89/00* (2006.01)

(52) U.S. Cl.
CPC ........ *A01K 89/0183* (2015.05); *A01K 89/006* (2013.01); *A01K 89/01925* (2015.05); *A01K 89/01931* (2015.05)

(58) Field of Classification Search
CPC .. A01K 89/015; A01K 89/033; A01K 89/052; A01K 89/056; A01K 89/01931; A01K 89/0183
USPC .................................................. 242/297, 303
See application file for complete search history.

(56) References Cited

U.S. PATENT DOCUMENTS

| 3,061,232 | A | * | 10/1962 | Clark | A01K 89/015 188/68 |
| 4,564,158 | A | * | 1/1986 | Moosberg | A01K 89/015 242/261 |
| 5,145,125 | A | * | 9/1992 | Morimoto | A01K 89/015 242/268 |
| 5,429,318 | A | * | 7/1995 | Sato | A01K 89/015 242/314 |
| 5,489,070 | A | * | 2/1996 | Puryear | A01K 89/015 242/261 |

(Continued)

FOREIGN PATENT DOCUMENTS

| KR | 200239070 | 11/2001 |
| KR | 20020015643 | 2/2002 |

(Continued)

*Primary Examiner* — Emmanuel M Marcelo
(74) *Attorney, Agent, or Firm* — Cantor Colburn LLP (57) ABSTRACT

Provided is a reel having a snap button for locking a spool that includes: a frame including a palm-facing first panel, a gear-facing second panel, a spool space between the first and second panel, and a connecting unit maintaining the space and including a first rib connecting the first and second panel to each other and combined with a fishing rod mount; a spool disposed in the space and having a shaft mounted on the first and second panels; a handle connected to the shaft; and a locking unit including a locking gear coupled to the shaft of the spool, a snap button in the first or second panel, a spring pressing the snap button upward; and a locking protrusion connected to the snap button and fitted in a locking groove between teeth of the locking gear when the snap button is pressed.

3 Claims, 8 Drawing Sheets

(56) References Cited

U.S. PATENT DOCUMENTS

| | | | | |
|---|---|---|---|---|
| 5,857,632 | A * | 1/1999 | Arkowski | A01K 89/016 192/45.018 |
| 5,897,069 | A * | 4/1999 | Brown | A01K 89/015 242/310 |
| 6,189,823 | B1 * | 2/2001 | Kobayashi | A01K 89/015 242/312 |
| 6,431,482 | B1 * | 8/2002 | Ikuta | A01K 89/015 242/247 |
| 6,511,007 | B1 * | 1/2003 | Matsuura | A01K 89/033 242/290 |
| 6,634,586 | B1 * | 10/2003 | Chang | A01K 89/015 242/247 |
| 2008/0173745 | A1 * | 7/2008 | Takechi | A01K 89/015 242/321 |
| 2009/0014573 | A1 * | 1/2009 | Kim | A01K 89/033 242/255 |
| 2011/0011966 | A1 * | 1/2011 | Takechi | A01K 89/015 242/255 |
| 2011/0315802 | A1 * | 12/2011 | Kuriyama | A01K 89/00 242/283 |
| 2013/0161433 | A1 * | 6/2013 | Takechi | A01K 89/033 242/243 |
| 2014/0263791 | A1 * | 9/2014 | Sabtu | A01K 89/01 242/224 |

FOREIGN PATENT DOCUMENTS

| | | |
|---|---|---|
| KR | 200305936 | 3/2003 |
| KR | 200432392 | 12/2006 |

* cited by examiner

FISHING REEL EQUIPPED WITH SNAP LOCK BUTTON FOR SPOOL

BACKGROUND OF THE INVENTION

Field of the Invention

The present invention relates to a fishing reel equipped with a snap lock button for a spool. More particularly, in order to solve the problem that when tension in a fishing line is larger than the maximum drag power, a fishing line may not be cut and a reel may be damaged, even if a spool is prevented from rotating by maximally tightening a drag to give up equipment or cut a fishing line when the equipment is stuck to the ground or various obstacles under water, the present invention relates to a fishing reel that makes it possible to simply cut a fishing line with a minimum loss of the fishing line and prevent damage to the parts in the fishing reel, because when a fishing rod is pulled with a locking protrusion inserted in a rectangular or trapezoidal locking groove of a locking gear connected with a spool shaft by simply pushing a snap button on a frame, the fishing line becomes tightened due to the equipment stuck to an obstacle, and a spool is intended to rotated, so even if a pressing force by the snap button is reduced or removed, the locking protrusion remains in the locking groove.

DESCRIPTION OF THE RELATED ART

Bait reels, or trolling or jigging reels for relatively large fishes employ various spool locking structure or anti-rotation structures.

For example, there is "Fishing bail arm motion lever brake spinning reel" in Korean Utility Model No. 20-0239070 (registered on Jul. 9, 2001), in which a bail arm reciprocates and a brake lever can be detachably attached.

In detail, a fishing line is uniformly wound on a spool that is stopped, by reciprocating not the spool, but a bail arm in a spinning reel for fishing, in which there is no front drag and a drag may be installed in a reel body and a main shaft is not moved forward/backward, so a disc drum can be mounted behind the main shaft (in the body) and rotation of the spool can be controlled by a lining ring making friction with the drum. Further, the lining is fastened to a lining slide, so when the lining slide is moved forward/backward, the drag can be tightened/loosened, and the spool can also be broken. The lining slide can be operated by pushing up and pulling down a drag lever behind the reel body and the drag can be loosened and stopped by pulling a brake lever (LB) with a fourth finger ahead of the reel. Further, the lining slide can be independently operated behind and ahead of the reel body by the two levers, so a reel can be used even without a front LB. Accordingly, there is provided a spinning reel with a movable bail arm used also as a brake lever by allowing a user to attach/detach an LB.

However, this invention does not relate to a spool locking structure that can prevent damage to a reel and an injury of a user when a user cuts a fishing line that cannot be returned due to equipment stuck to an obstacle.

Further, there is "Spool locking device of double bearing reel) in Korean Patent Application Publication No. 10-2002-0015643 (published on Feb. 28, 2002), which relates to a spool locking device of a double bearing reel that prevents a spool, which is mounted on a reel body of a double bearing reel to be rotatable in both directions and has a pair of flanges at both ends, from rotating in the unrolling direction of a fishing line.

In detail, the spool locking device of a double bearing reel, which is a device that prevents a spool, which is mounted on a reel body of a double bearing reel to be rotatable in both directions and has a pair of flanges at both ends, from rotating in the unrolling direction of a fishing line, has a locking unit, a moving unit, and locking groove, in which the locking unit can move forward and rearward on the reel body, the moving unit moves the locking unit forward and rearward, and the locking groove is formed on an outer side of the pair of flanges and coupled to the front end of the locking unit moved forward.

However, the locking unit of this invention has a complicated structure and includes a plurality of parts, so the locking structure and the reel are necessarily severely damaged when a user cuts and returns a fishing line, giving up equipment stuck to an obstacle, considering the necessary tolerances between the parts, so it cannot be considered as providing a realistic technology in terms of durability.

Next, there is "Rotor-rocking device of spinning reel" in Korean Utility Model No. 20-0305936 (registered on Feb. 17, 2003), which proposes a rotor locking device of a spinning reel that can prevent a problem that a fishing line is cut or a weight or bait from separating by preventing automatic return of a bail due to rotation of a rotor when a bait is thrown after the bail is opened, by increasing a friction force on a locking pin by disposing a rubber packing on a flange where the body of a spinning reel and a body flange cover are combined.

However, this invention also has a limit in being used as a spool locking structure for cutting and returning a fishing line with equipment left stuck to an obstacle.

Further, there is "Spool brake for reel" in Korean Utility Model No. 20-0432392 (registered on Nov. 27, 2006), which proposes a spool locking device for a double-shaft reel that allows for free braking of a spool when a fish is hooked.

This invention relates to a double-shaft reel including a reel body mounted on a fishing rod with two side plate disposed in parallel at both sides and accommodating a spool on a spool shaft, and a cover coupled to a side of the body, and provides a spool locking device of a double-shaft reel that includes: a ratchet coupled to an end of the spool shaft and having a plurality of steps formed with predetermined intervals in a rotational direction around the outer side; a braking lever rotatably disposed inside the cover, at a predetermined distance on the same line as the ratchet and having one end protruding a predetermined distance outward through an opening of the cover; a torsion spring elastically supporting of rotation of the braking lever with one end coupled to the braking lever and the other end fixed to the cover; a locking protrusion disposed between the ratchet and the braking lever and preventing backward rotation of the ratchet by rotating and engaging with the ratchet when the braking lever is operated; and a tension spring elastically supporting the locking protrusion with one end coupled to the locking protrusion and the other end fixed to the cover.

However, the spooling locking device, the main aspect of this invention, is also complicated, as in Korean Patent Application Publication No. 10-2002-0015643 described above, so it is an incomplete technology in terms of durability to be used for cutting a fishing line in an emergency when large force is rapidly and continuously applied.

SUMMARY OF THE INVENTION

According to the present invention, a locking protrusion is locked into a locking groove of a locking gear on a spool shaft when a snap button disposed on a first panel or a second panel and elastically supported by a spring is pressed, so a spool locking structure is simply and easily achieved.

Accordingly, when equipment is stuck to the ground or an obstacle under water and it is required to submit to a loss of equipment by cutting a fishing line, it may be possible to pull and cut the fishing line with a maximum drag power by maximally tightening a drag or to simply cut the fishing line.

In the former case, if the maximum drag power is smaller than the tension in the fishing line, the fishing line is not cut and load is applied to a reel, so durability decreases or a breakdown may be caused.

Further, in the later case, when a user cuts the fishing line with the spool fixed with a hand or forcibly pull and cut the fishing line, the hand may be injured.

Accordingly, an object of the present invention is to provide a fishing reel having a spool locking structure using a snap button that is operated in a so-called one-touch type (snap or quick type) that is not complicated like the type of performing locking/unlocking by turning on/off a locking button and does not require to keep pressing a spool or a locking button.

Further, another object of the present invention is to provide a fishing reel having a snap button for locking a spool that allows for cutting a fishing line with a minimum loss, because locking grooves between the teeth of locking gears of a locking unit have a rectangular or trapezoidal cross-section and a locking protrusion has a rectangular cross-section, so when a fishing rod is pulled to cut a fishing line, with the locking protrusion locked in a locking grove by pressing a snap button, tension of the fishing line is intended to rotate a spool, but the locking protrusion remains locked being in the locking groove (the locking gear is rotated with fine rotation of the spool, so the inner side of the locking groove presses the locking protrusion in close contact with it and the locking protrusion is not moved backward even against elasticity of a spring), and accordingly, the locking protrusion remains locked in the locking groove even if the pressing force of the snap button is reduced or removed. Further, another object of the present invention is to provide a fishing reel having a snap button for locking a spool that unlocks a snap button even without specific operation, because the tension in the fishing line is removed after the fishing line is cut, so torque applied to the spool is removed, the locking gear is unlocked, and the locking protrusion is separated from the locking groove by elasticity of the spring.

Another object of the present invention is to provide a fishing reel having a frame that, in addition to the characteristics of the locking unit, has improved machinability and productivity with a minimized machining cost by reducing the portions, which requires milling which rotates and feeds a cutting tool and needs a relatively high cost, but by maximizing the portions, which requires lathe processing which rotates a workpiece, feeds a cutting tool, and needs a relatively low cost, that can be rounded at the portions, which user's hands or body comes in contact with, through chamfering, particularly, inside chamfering.

Another object of the present invention is to provide a reel frame for fishing in which, when a connecting unit for maintaining a spool space between a palm-facing first panel and a gear-facing second panel includes first rib for coupling a fishing rod mount and a second or a third rib for reinforcement, the portions that a human body comes in contact with are rounded by lathe processing that rotates a metal ingot such as aluminum and feeds a cutting tool, in which the first to third ribs are configured to have a body and curved ends for coupling the first and second panel at both ends of the body in order to perform lathe processing for making machined corners of the first and second panels, which are the main portions to be machined in lathe processing, that is, inside chamfered portions, which are difficult to make relative to outside chamfered portions and brought in contact with the space; recesses are formed between the curved ends and the first and second panels, and a cutting tool rotated for turning can approach the inside chamfered portions of the first and second panels of the metal ingot due to the recesses, so the portions chamfered by turning are maximized.

Another object of the present invention is to provide a fishing reel having a frame that allows a user to easily hold the reel frame and do various types of work by making a first panel smaller in area than a second panel when seen from a side.

In order to achieve the above object, according to one aspect of the present invention, there is provided a reel having a snap button for locking a spool that includes: a frame including a palm-facing first panel, a gear-facing second panel, a spool space between the first and second panel, and a connecting unit maintaining the space and including a first rib connecting the first and second panel to each other and combined with a fishing rod mount; a spool disposed in the space and having a shaft mounted on the first and second panels; a handle connected to the shaft; and a locking unit including a locking gear coupled to the shaft of the spool, a snap button in the first or second panel, a spring keeping at pressing the snap button upward; and a locking protrusion connected to the snap button and fitted in a locking groove between teeth of the locking gear when the snap button is pressed.

In the reel having a snap button for locking a spool according to the present invention, wherein the locking groove between the teeth of the locking gear may have a rectangular or trapezoidal cross-section, the locking protrusion may have a rectangular cross-section, a lower end of the locking protrusion may have a tapered portion for moving in, and a tolerance between the locking groove and the locking protrusion may be 1/1000~500/1000 mm.

The fishing reel according to the present invention includes a frame including: a palm-facing first panel; a gear-facing second panel; a spool space between the first and second panel; and a connecting unit maintaining the space and including a first rib connecting the first and second panel to each other and combined with a fishing rod mount, in which the first rib has a body and curved ends at both sides of the body to make a recess between the first and second panels and the first rib, for turning (namely, lathe processing) for making inside chamfered portions around inner sides of the first and second panels.

Further, in the fishing reel having improved productivity according to the present invention, the connecting unit may further include a second rib, or second and third rib for reinforcement spaced from the first rib and having curved ends for making the body and the recesses at both ends of the body, the first panel may be smaller in area than the second panel when being seen from a side, and the first rib has a recess for keeping a fishing rod mount.

According to the present invention, there is provided a fishing reel having a snap button for locking a spool in which a locking protrusion is locked into a locking groove of a locking gear on a spool shaft when a snap button disposed on a first panel or a second panel and elastically supported by a spring is pressed, thereby simply and easily achieving a spool locking structure.

Accordingly, when equipment is stuck to the ground or an obstacle under water and it is required to submit to a loss of equipment by cutting a fishing line, it may be possible to pull and cut the fishing line with a maximum drag power by maximally tightening a drag or to simply cut the fishing line, when fishing with a fishing reel having a spool locking structure using a snap button operated in a so-called one-touch (snap or quick) type. However, in the former case, if the maximum drag power is smaller than the tension in the fishing line, the fishing line is not cut and load is applied to a reel, so durability decreases or a breakdown may be caused. Further, in the later case, when a user cuts the fishing line with the spool fixed with a hand or forcibly pulls and cuts the fishing line, his/her hand may be injured. Accordingly, it is possible to prevent inconvenience such as performing locking/unlocking by turning on/off a locking button and or continuously pressing a spool or a locking button.

Further, according to the present invention, there is provided a fishing reel having a snap button for locking a spool that allows for cutting a fishing line with a minimum loss, because locking grooves between the teeth of locking gears of a locking unit have a rectangular or trapezoidal cross-section and a locking protrusion has a rectangular cross-section, so when a fishing rod is pulled to cut a fishing line, with the locking protrusion locked in a locking grove by pressing a snap button, tension of the fishing line is intended to rotate a spool, but the locking protrusion remains locked being in the locking groove (the locking gear is rotated with fine rotation of the spool, so the inner side of the locking groove presses the locking protrusion in close contact with it and the locking protrusion is not moved backward even against elasticity of a spring), and accordingly, the locking protrusion remains locked in the locking groove even if the pressing force of the snap button is reduced or removed. Further, according to the present invention, there is provided a fishing reel having a snap button for locking a spool that unlocks a snap button even without specific operation, because the tension in the fishing line is removed after the fishing line is cut, so torque applied to the spool is removed, the locking gear is unlocked, and the locking protrusion is separated from the locking groove by elasticity of the spring.

According to the fishing reel having the characteristics of the frame that has improved machinability of the preset invention, when a connecting unit for maintaining a spool space between a palm-facing first panel and a gear-facing second panel includes first rib for coupling a fishing rod mount and a second or a third rib for reinforcement, the portions that a human body comes in contact with are rounded by turning that rotates a metal ingot such as aluminum and feeds a cutting tool, in which the first to third ribs are configured to have a body and curved ends for coupling the first and second panel at both ends of the body in order to perform turning for making machined corners of the first and second panels, which are the main portions to be machined in turning, that is, inside chamfered portions, which are difficult to make relative to outside chamfered portions and brought in contact with the space; recesses are formed between the curved ends and the first and second panels, and a cutting tool rotated for turning can approach the inside chamfered portions of the first and second panels of the metal ingot due to the recesses, so the portions chamfered by lathe processing are maximized. Further, a user can easily hold a reel frame and do various types of work by making a first panel smaller in area than a second panel when seen from a side. Accordingly, by reducing the portions, which require milling which rotates and feeds a cutting tool and needs a relatively high cost, but by maximizing the portions, which requires lathe processing which rotates a workpiece, feeds a cutting tool, and needs a relatively low cost, it is possible to round the portions, which user's hands or body comes in contact with, through chamfering, particularly, inside chamfering.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The present invention will be described hereafter in detail with reference to the accompanying drawings.

The present invention may be modified in various ways and implemented by various exemplary embodiments, so that aspects (or exemplary embodiments) are shown in the drawings and will be described in detail. However, it is to be understood that the present invention is not limited to the specific exemplary embodiments, but includes all modifications, equivalents, and substitutions included in the spirit and the scope of the present invention.

Reference numerals in the drawings, particularly, reference numerals that are the same in tens and units, or tens, units, and alphabets indicate the components having the same or similar functions, and if not specifically stated, the components indicated by those reference numerals can be considered as components following this standard.

Components in the drawings may be shown excessively large (or thick) or small (or thin) or simply shown in consideration of the convenience of understanding, but it should not be construed as limiting the protective range of the present invention.

Terminologies used herein are for explaining specific aspects (or embodiments) and are not intended to limit the present invention. Singular forms are intended to include plural forms unless the context clearly indicates otherwise. It will be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless defined otherwise, it is to be understood that all the terms used in the specification including technical and scientific terms have the same meaning as those that are understood by those who skilled in the art. It must be understood that the terms defined by the dictionary are identical with the meanings within the context of the related art, and they should not be ideally or excessively formally defined unless the context clearly dictates otherwise.

Well-known functions and configurations may not be described, if it is determined that the description of them may unnecessarily make the spirit of the present invention unclear.

Terms 'first', 'second', and 'third' used herein are only for discriminating different components, not limiting the manufacturing order, and may not be the same in the detailed description and claims.

Non-specific, but approximate directions are defined in FIGS. 1, 2, 5, and 8 describe a frame F for fishing reel having improved machinability according to the present invention.

In the drawings, a palm-side first panel 10 and a gear-side second panel 20 are defined as the outside, a space 30 for a spool S is defined as the inside, and these directions are applied to the description and claims relating to other figures, unless specifically stated.

Further, when a first key point relating to a locking unit L of the present invention is described with reference to FIGS. 3 and 4, an upper portion and a lower portion are determined on the basis of operation of the snap button L1 in the figures.

First, as shown in FIGS. 1, 2, 5, and 8, a fishing reel R according to the present invention includes a frame F, a spool S, and a spool handle H (other components relating to common fishing reels such as a drag power adjustment device are not described herein).

In the fishing reel R, a leg for fixing a reel to a fishing rod, that is, a fishing rod mount M is coupled to a first rib 41 of a connecting unit 40 of the frame F.

The frame F, as described below, has a palm-facing first panel 10, a gear-facing second panel 20, a spool space 30 between the first panel and the second panel, and a connecting unit 40 maintaining the space and including first to third ribs 41, 43, and 45 connecting the first and second panels and combined with a fishing rod mount M.

One of important parts of the present invention is the locking unit L, which includes a snap button L1 and is used to forcibly restore a fishing rod or cut a fishing line and keep as much of the fishing line as possible with equipment left when the equipment such as a hook is stuck to obstacles such as waterweeds or rocks under water, is disposed on the palm-facing first panel 10, that is, between inside and outside chamfered portions 11 and 13 (if necessary, on the gear-facing second panel 20).

In the related art, when equipment is stuck to the ground or an obstacle under water and it is required to submit to a loss of equipment by cutting a fishing line, it may be possible to pull and cut the fishing line with a maximum drag power by maximally tightening a drag or to simply cut the fishing line.

In the former case, if the maximum drag power is smaller than the tension in the fishing line, the fishing line is not cut and load is applied to a reel, so durability decreases or a breakdown may be caused.

Further, in the later case, when a user cuts the fishing line with the spool fixed with a hand or forcibly pulls and cuts the fishing line, his/her hand may be injured.

Further, when a locking button is complicated in structure and has to be repeatedly pressed to be locked/unlocked in the related art, it is troublesome to operate the button and it is difficult to concentrate on cutting a fishing line. Further, the type of pressing a spool or a locking button is also inconvenient and complicated.

Accordingly, the present invention proposes a fishing reel having a spool locking structure using a so-called one-touch (snap or quick) type snap button.

In the fishing reel R according to the present invention, the locking unit L, as shown in FIGS. 1 to 4, includes: a locking gear L2 on a shaft S1 (connected to the handle H in various ways) of the spool S mounted on the first and second panels 10 and 20 (especially on the first panel 10) in the space 30 of the frame F, and a locking protrusion L3 locked into or unlocked out of a locking groove LG of a locking gear when the snap button 11 is pressed down or released up.

Figure 3:
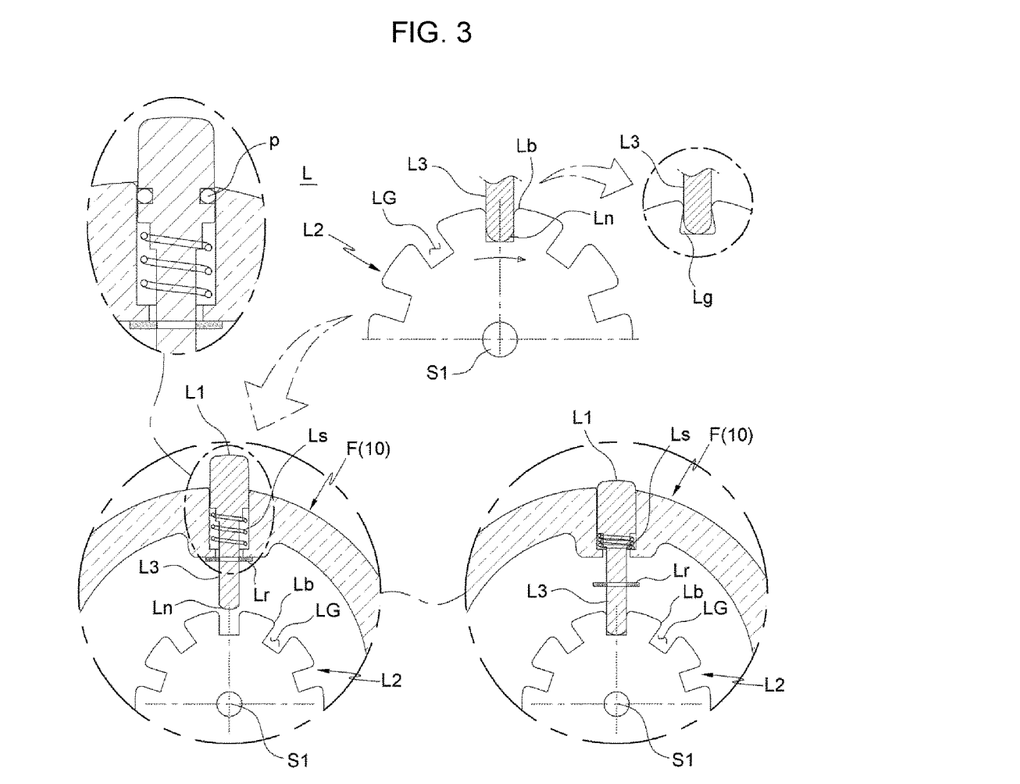
FIGS. 3 and 4 are a view comparing main parts of a fishing reel according to the present invention and a comparative view, respectively.
Figure 4:
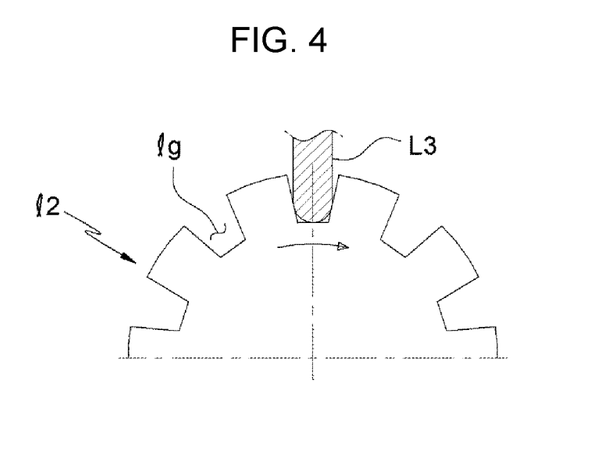

In particular, the locking grooves LG or Lg formed between the teeth of the locking gear L3 has a rectangular or trapezoidal cross-section (see the modified example in a circle indicated by a dashed dotted line at the right side in FIG. 3) and the locking protrusion L3 has a rectangular cross-section.

When a user presses the snap button L1 to lock the spool S with the locking protrusion L3 locked in a locking groove LG or Lg and then pulls the fishing rod in order to cut a shifting line with equipment left stuck to an obstacle in water when fishing, tension in the fishing line rotates the spool and the locking gear L2 connected to the spool shaft S1 is correspondingly intended to rotate.

However, a side (the left side in FIG. 3) of the locking groove presses the locking protrusion L3, so the locking protrusion remains locked in the locking groove, and even if the snap button L1 is released (the user takes the hand off), the snap button and the locking protrusion are not released (unlocked) even against elasticity of a spring Ls for lifting the snap button.

The locking protrusion-integrated snap button L1 installed in the frame F, that is, in a hole of the first panel 10 with the spring Ls fitted on the locking protrusion L3 is prevented from separating by a snap ring type locking protrusion Lr inserted in a ring-shaped groove formed around the locking protrusion.

As shown the circle indicated by a dashed dotted line at the upper left side in FIG. 3, a packing ring 'p' is fitted on the snap button 11 of the locking unit L to prevent dirt, moisture, or water from permeating into the palm-facing first panel 10.

When the tension in the fishing line is removed by, for example, cutting the fishing line, torque applied to the spool S and the locking gear L2 is removed, so the locking protrusion L3 is separated upward from the locking groove LG or Lg by elasticity of the spring Ls and the spool is unlocked.

An expansion Lb wider than other portion is formed at the inlet of the locking groove LG or Lg to allow the locking protrusion to move in and a tapered portion Ln is formed at the lower end of the locking protrusion L3.

A tolerance of 1/1000~500/1000 mm or 10/1000~300/1000 mm may be provided between the locking groove LG and Lg and the locking protrusion L3, and by this tolerance, the locking protrusion locked in the locking groove can be prevented from separating even without the snap button pressed when a user pulls a fishing line to cut it.

If the locking grooves LG and Lg do not have a rectangular or trapezoidal cross-section, the locking protrusion L3 does not a rectangular cross-section, and the tolerance between the locking groove and the locking protrusion is not 1/1000~500/1000 mm, that is, if locking grooves lg of a locking gear l2 have an inverse trapezoidal shape and the locking groove is larger than the locking groove, so the tolerance is over 0.5 mm, the locking protrusion L3 is separated upward from the locking grooves lg by elasticity of a spring, when the pressed snapped button is released with a fishing line pulled to be cut.

The tapered portion Ln of the locking protrusion L3 may have various shapes and sizes as long as it can keep the lower end locked in the locking groove. The horizontal cross-sections of the locking protrusion and the locking grooves may be circles in consideration of easy fitting and non-directionality.

In this respect, the expansion Lb of the locking groove means the shape of the inlet allowing the locking protrusion to be easily fitted.

Further, the cross-section of the locking protrusion 13, particularly, the rectangular vertical cross-section means the shape of the body except for the tapered portion Ln.

The cross-section of the locking groove LG, particularly, the rectangular vertical cross-section (normal trapezoid relative to the inverse trapezoid in FIG. 4) means the shape of the portion around the lower portion except for the expansion Lb.

The cross-section of the locking grooves Lg, particularly, the trapezoidal vertical cross-section (normal trapezoid relative to the inverse trapezoid in FIG. 4) means the shape of a portion around the lower portion except for the expansion Lb.

The tolerance of 1/1000~500/1000 mm or 10/1000~300/1000 mm between the normal trapezoidal locking groove Lg and the locking protrusion means the tolerance between the narrowest trapezoidal locking groove Lg right under the expansion Lb and the body (the portion over the tapered portion Ln) of the locking protrusion L3.

The tolerance between the locking grooves LG and the locking protrusion also means the tolerance between the straight portion under the expansion Lb and the body of the locking protrusion.

The frame F for a fishing reel R having improved machinability, which is another important part of the present invention, includes the first panel 10, the second panel 20, the spool space 30, and the connecting portion 40 having the first rib 41 that connects the panels with the space therebetween.

For the frame F, an improved machining technique and a frame structure for this technique for a trolling reel or a jigging reel for relatively large fishes as compared with a bait reel are mainly described in the specification and claims.

However, if necessary, post machine with a die casting frame may be used, so the present invention is not limited by a raw material for cutting.

The 'gear-facing' second panel 20 is a part keeping various locking gears for connecting the handle H and the spool and is generally used in this field.

The 'palm-facing' first panel 10 is also generally used in this field because a user operates it with a fishing rod with the first panel 10 of the reel R in his/her hand (in contact with a palm) when fishing.

The first panel 10 may be larger in area than the second panel 20 when being seen from a side in order to ensure and improve operability, grip, and ease of holding when a user holds the reel frame and makes various actions including fishing with the reel frame.

Figure 1:
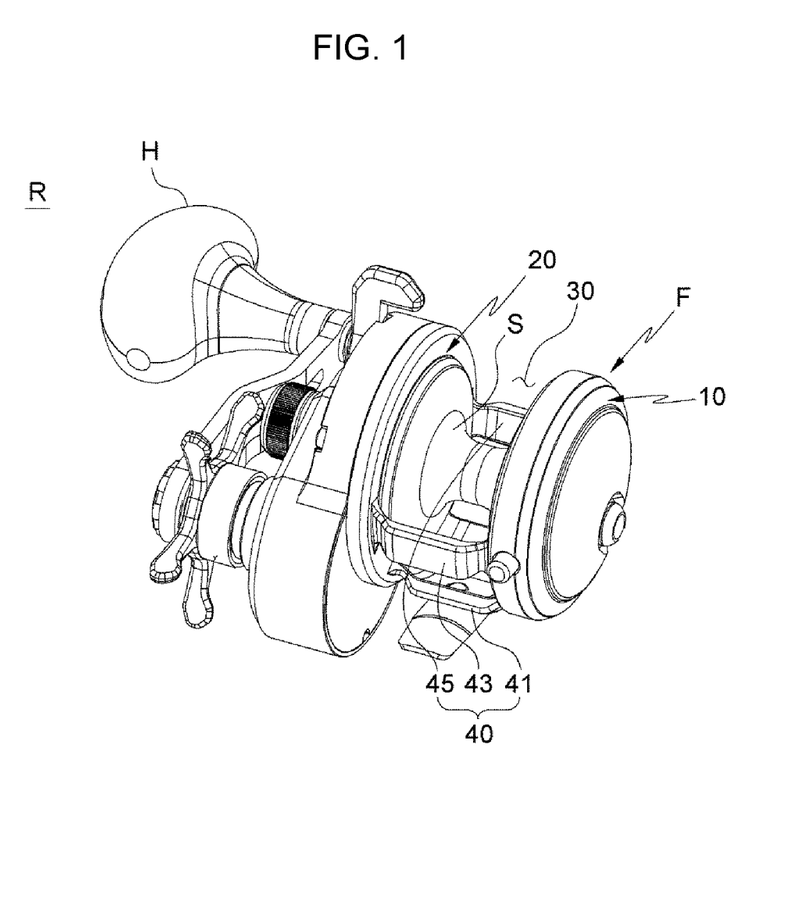
FIGS. 1 and 2 are perspective views of a fishing reel according to the present invention.
Figure 2:
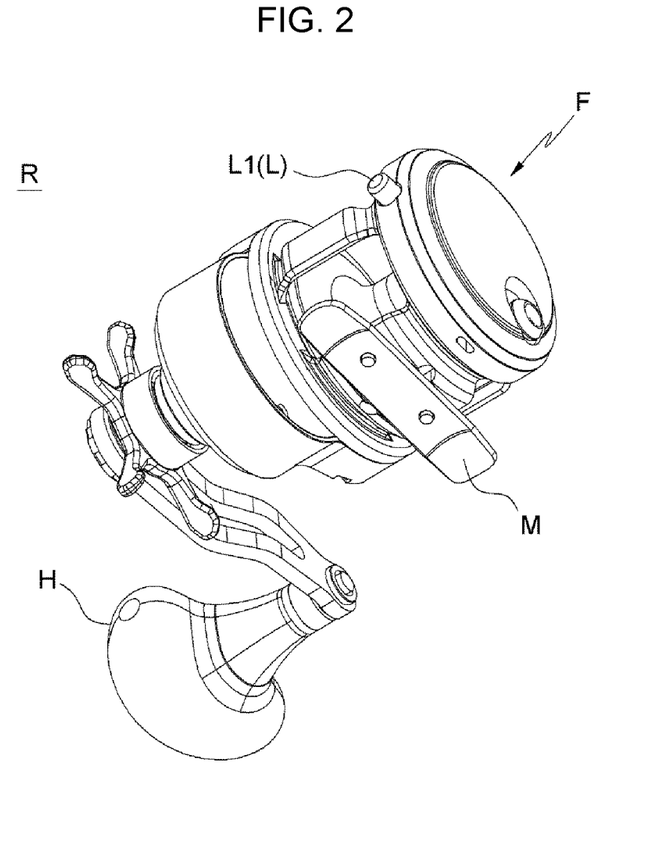
Figure 5:
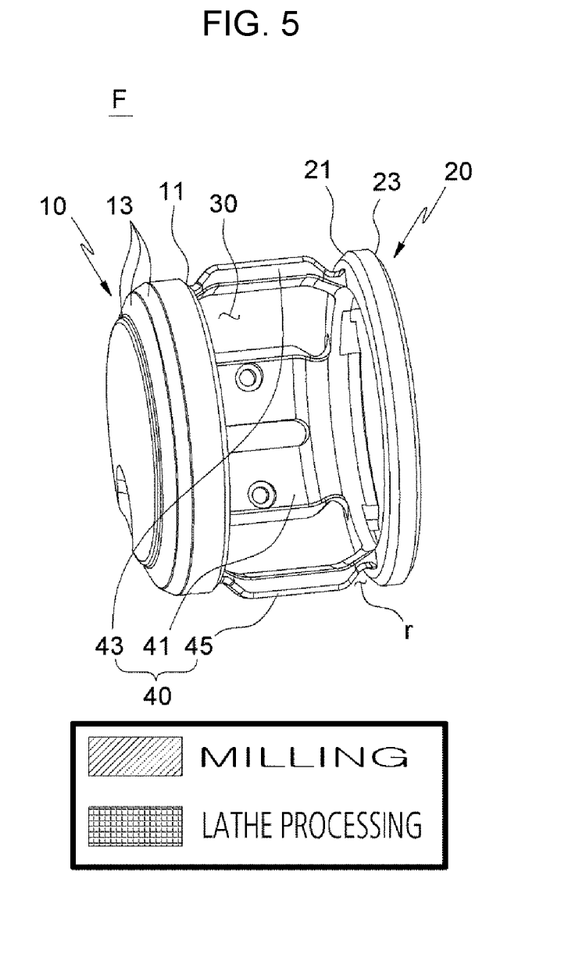
FIGS. 5 to 8 are views showing a reel frame for fishing according to the present invention.

As can be seen in FIGS. 1, 2, and 5, the connecting unit 40 for maintaining the space 30 for the spool S disposed on a shaft between the first and second panel 10 and 20 fundamentally includes the first rib 41 connecting the first and second panel and combined with the fishing rod mount M.

The first rib 41 has a recession 41a for increasing stability by increasing a contact area with the fishing rod mount M therein and fixing holes 41b for fastening the mount, for example, by riveting.

The first rib is divided into two parts by a cutting hole at the middle portion to reduce the weight.

The connecting unit 40 further includes a second rib 43 for reinforcement, or second and third ribs 43 and 45, which are spaced from the first rib 41.

The first to third ribs are inclined under the fishing rod mount M, with the tops open to ensure a space where the fishing line wound around the spool S is loosened and tightened.

The outer sides that are brought in contact with a hand such as a palm and other parts of a body may be rounded as smooth as possible when the frame F is machined, and corners may be chamfered to make the outer sides smooth.

To this end, a metal ingot such as aluminum or an aluminum alloy is cut to manufacture a frame and there are lathe processing and milling.

Lathe processing) is machining that rotates a workpiece and feeds a cutting tool, so it is suitable for machining the outer side of a workpiece rotated on a chuck in a symmetric circle shape and the cost is relatively low.

On the other hand, milling is a type of machining that rotates and feeds a cutting tool with a workpiece fixed, so it can make straight and curved shapes, but takes relatively long time and high cost for machining.

In common fishing reel frames of the related art, there was no problem in using the lathe processing to machine the outer corners, that is, to make the outside chamfered portions 13 and 23 of the palm-facing first panel 10 and the gear-facing second panel 20.

However, the inner corners, that is, the inside chamfered portions 11 and 21 of the first and second panels 10 and 20 being in contact with the space 30 cannot be made by lathe processing due to interference of the ribs 41, 43, and 45 of the connecting unit 40 when a workpiece is rotated, so these portions require milling.

To solve this problem, the frame F of the present invention has a structure in which the shapes of the ribs 41, 43, 45 are finally made by a body B and curved ends b formed at both sides of the body and being in contact with a recess (r) and the curved ends b maintain the space 30 by being connected to the inside of the first and second panels.

Accordingly, the inside and outside chamfered portions 11 and 21, 13 and 23 of the first and second panels 10 and 20 are formed to fit the entire shape, that is, a designed shape, by applying lathe processing first on a metal ingot (bar-shaped ingot) and then the outer shapes of the ribs 41, 43, and 45 of the connecting unit are formed (that is, a recess (r) ensuring entrance of the top of a cutting tool in lathe processing for making the inside chamfered portions 11 and 21 is formed (deeper than outer sides 10s between the inside and outside chamfered portions 11 and 21, 13 and 23), the curved ends (b) at both sides of the body B of the rib are formed, and then the inside chamfered portions 11 and 21 of the first and second panels 10 and 20 are formed with the recess (r) therebetween, thereby forming the entire rounded shape.)

Next, the space 30 is formed by a cutting tool for milling which is automatically rotated and fed and then surface of the ribs that are in contact with the space are formed such that the ribs 41, 43, and 45 are separated.

As described above, a workpiece such as a metal ingot (bar-shaped ingot) is fixed on a chuck of a lathe such that a machining rotational axis is arranged in the installation direction of the spool S and then primary lathe processing is performed to make the entire outer shape including the inside and outside chamfered portions 11 and 21, 13 and 23 of the first and second panels 10 and 20 in a circular shape around the machining rotational axis by rotating the workpiece and feeding a cutting tool for lathe processing.

Secondary milling is performed on the space 30, the inner sides of the first and second panels 10 and 20 being in contact with the space, and the contact surfaces of the ribs 41, 43, and 45, using a cutting tool for milling that is rotated and feed in a direction crossing the machining rotational axis in the primary lathe processing, thereby completing the frame F of the present invention.

Figure 6:
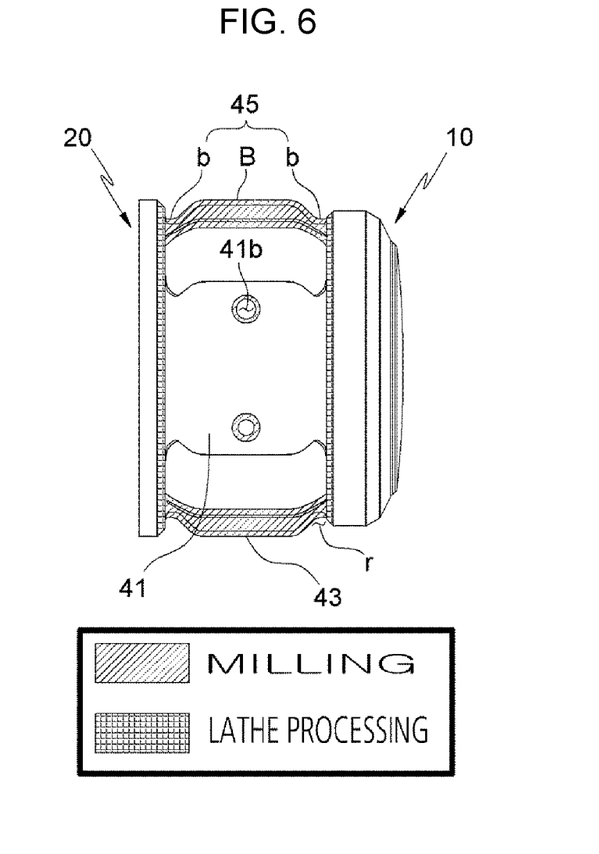
Figure 7:
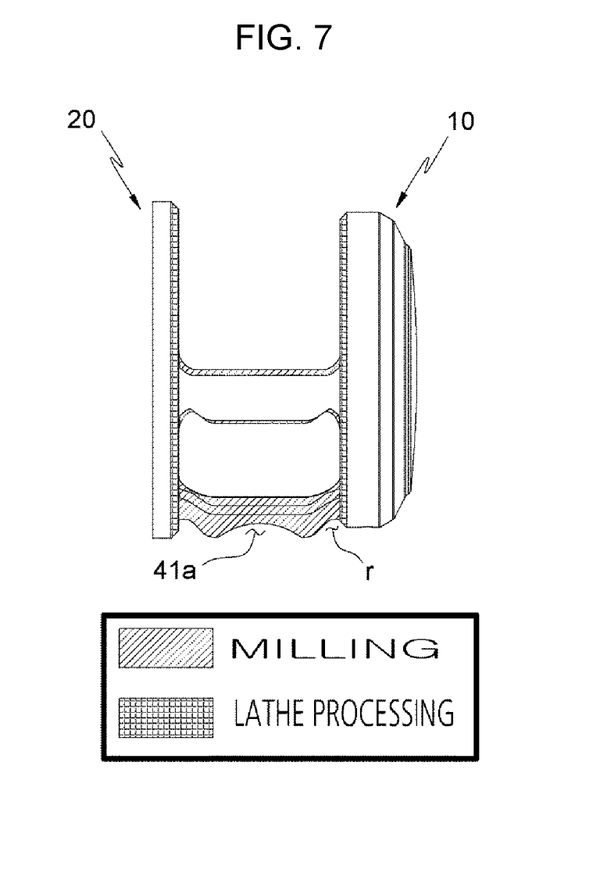
Figure 8:
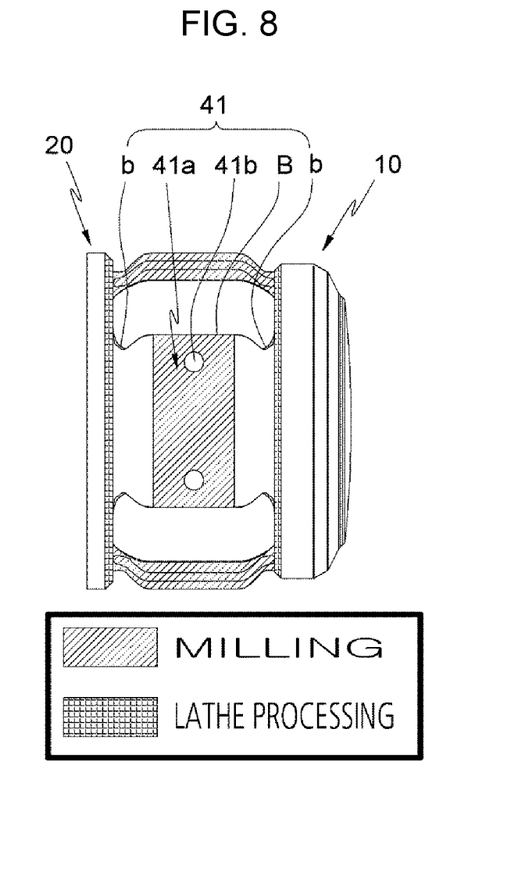

Referring to FIGS. 6, 7, and 8 showing the frame in various directions, main parts that have undergone lathe processing, that is, the inside chamfered portions 11 and 21, which were necessarily milled in fishing reels of the related art, but were machined by lathe processing in accordance with the present invention are shown by a lattice pattern.

Sides of the first to third ribs 41, 43, and 43 adjacent to the inside chamfered portions, the portions around the recession 41*a* and the fixing holes 41*b* of the first rib 41, where milling was applied, are hatched.

Obviously, the surfaces of the first and second panels being in contact with the space 30 (surfaces inside a virtual circle that is in contact with the contact portions of the curved ends (b) and the first and second panels, like the outer sides of the curved portions (b) of the rib, that is, the recess (r) with a workpiece held on a chuck and rotated around the machining rotary shaft in lathe processing) and the inner sides of the ribs are formed by milling, but not shown for the convenience.

Other than improvement of productivity and reduction of cost by lathe processing of the inside and outside chamfered portions 11 and 21, 13 and 23 of the first and second panels 10 and 20, concentricity is improved and high roundness and excellent surface smoothness can be achieved because circular cutting is performed by rotating a workpiece and feeding and bringing a cutting tool in contact with the workpiece during lathe processing.

On the other hand, in the resultant frame F that has undergone milling, grip and stability in holding of the palm-facing first panel 10 of the fishing reel R are also improved by the curved ends (b) of the ribs, that is, the recess (r).

Although common well-known structures such as a bait reel, a trolling reel, a drag power adjustment device, a braking power adjustment device of a spool were not described above, those skilled in the art would easily estimate and infer the structures.

Further, a fishing reel and a frame having specific shapes and structures were described above with reference to the accompanying drawings to explain the present invention, but the present invention may be changed, modified, and replaced in various ways by those skilled in the art, and those changes, modifications, and replacement should be construed as being in included in the protective range of the present invention.

What is claimed is:

1. A fishing reel comprising:
    a frame including a palm-facing first panel having a disk shape, a gear-facing second panel having a disk shape, a spool space between the palm-facing first panel and the gear-facing second panel, and a connecting unit maintaining the spool space and including a first rib connecting the palm-facing first panel and the gear-facing second panel to each other, the first rib being combined with a fishing rod mount;
    a spool disposed in the spool space and having a shaft mounted on the palm-facing first panel and the gear-facing second panel;
    a handle connected to the shaft; and
    a locking unit including a locking gear fixedly coupled to the shaft of the spool, a snap button in the palm-facing first panel or the gear-facing second panel, a spring pressing the snap button upward; and a locking protrusion connected to the snap button and configured to be fitted in a locking groove between teeth of the locking gear when the snap button is pressed,
    wherein the palm-facing first panel is composed of a first circumferential surface, a first inner chamfered portion formed along one end of the first circumferential surface, and a first outer chamfered portion formed along the other end of the first circumferential surface, and wherein the gear-facing second panel is composed of a second circumferential surface, a second inner chamfered portion formed along one end of the second circumferential surface, and a second outer chamfered portion formed along the other end of the second circumferential surface,
    wherein the first rib comprises a body, a first curved end being inwardly curved toward the shaft and coupled with a radially inner side of the first inner chamfered portion, and a second curved end being inwardly curved toward the shaft and coupled with a radially inner side of the second inner chambered portion to make a recess between the body and the first inner chamfered portion and between the body and the second inner chambered portion, respectively, and
    wherein the first rib, the palm-facing first panel, and the gear-facing second panel form a monolithic integral single body.

2. The fishing reel of claim 1, wherein the locking groove between the teeth of the locking gear has a rectangular or trapezoidal cross-section and the locking protrusion has a rectangular cross-section.

3. The fishing reel of claim 2, wherein a lower end of the locking protrusion has a tapered portion for moving in and a tolerance between the locking groove and the locking protrusion is 1/1000~500/1000 mm.

* * * * *